Oct. 12, 1971            A. S. BILBY            3,611,709
MULTIPLE PURPOSE LOG CHAIN
Filed Feb. 9, 1970
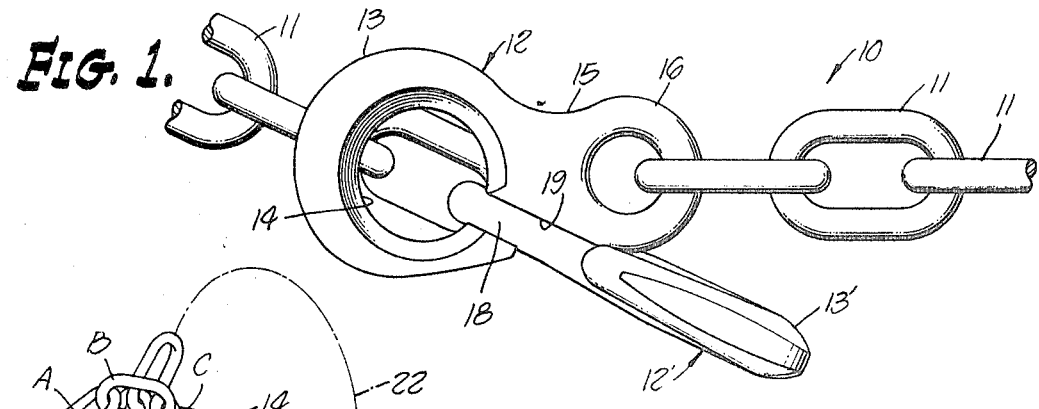
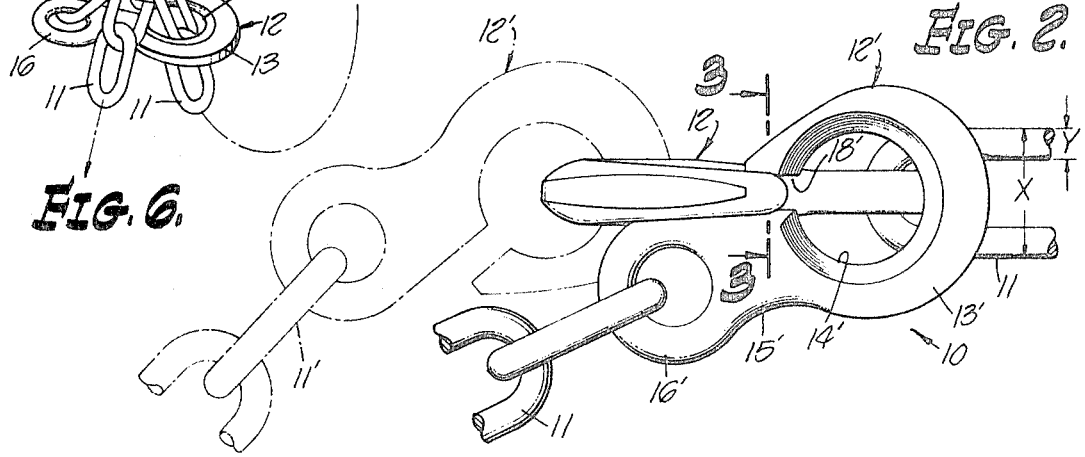
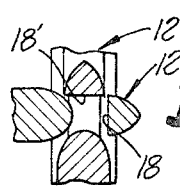
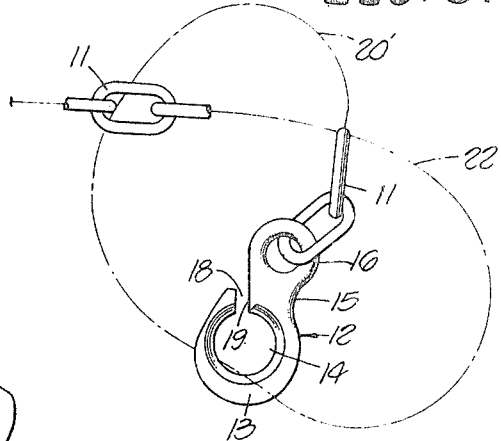
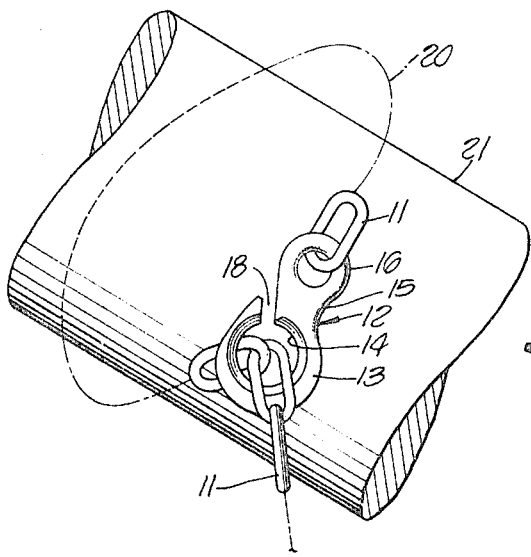
INVENTOR
ALVIN S. BILBEY
BY
ATTORNEYS 3,611,709
MULTIPLE PURPOSE LOG CHAIN
Alvin S. Bilbey, 939 E St., Taft, Calif. 93268
Filed Feb. 9, 1970, Ser. No. 9,530
Int. Cl. F16g 15/00
U.S. Cl. 59—93                                    5 Claims

ABSTRACT OF THE DISCLOSURE

A log chain having similarly shaped hooks at either end contoured for interlocking assembly when shifted bodily while held in predetermined relative positions. The circular opening through each hook is sized to pass freely over the transverse width of the elongated chain links which are so proportioned that the three end links can be used to embrace another portion of the chain to lock it immovably in a fixed choke. Alternatively, the chain passes freely through the hook opening when used to provide a free running choke.

---

This invention relates to log chains, and more particularly to a chain equipped with specially designed hooks at its ends usable selectively to form either a fixed choke or a free running choke.

Users of log chains frequently have need for utilizing both a fixed choke and a free running choke. In this connection it is pointed out that a free running choke is one having a loop encircling an object in such manner that tensioning of the chain causes the loop or choke to contract and grip the object more firmly. A fixed choke is one in which a loop of a desired fixed size is formed from the chain and in such manner that the choke cannot change in size during application of the load force.

Many log chains in common use have a hook at one or both ends with a sufficiently large opening that the chain proper will pass freely therethrough to provide a free running choke. Such chains require resort to special accessories or expedients to form a fixed choke. Other chains in common use are equipped with hooks designed to clip over a selected link and cooperating with an adjacent link to provide a fixed choke but are subject to the serious disadvantage of not being usable to provide a free running choke.

By the present invention the shortcomings and disadvantages of prior log chains are avoided without need for any accessories or extra pieces and enabling the user to utilize the hook to form a fixed choke or a free running choke with equal ease and expediency without resort to auxiliaries and without risk of either adjustment becoming disassembled unintentionally. This is accomplished by provding specally designed hooks at one or both ends of the chain having a circular opening of a diameter loosely passing the transverse width of the elongated links of the chain. Each hook has a specially contoured restricted entrance spaced closely beside the hook shank and sufficiently wide to freely pass the mid portion of a link. If the chain is equipped with identical hooks at its ends, then the hooks may be coupled to one another or to the similar hook of another chain by holding the axes of the entrance passages in alignment with the main bodies at right angles to one another while the hooks are bodily shifted toward one another. Disassembly is possible only by following the reverse of the assembly procedure. The point of attachment of the chain to the end of the hook shank is so selected that the three end links of the chain cooperate to lock a selected mid length of the chain immovably against the hook shank when used to form a fixed choke. When so assembled, the third link is located partially within the hook opening and holding the second link flatwise generally parallel to the plane of the hook and clamping an underlying link of the choke immovably against the hook shank.

Accordingly, it is a primary object of the present invention to provide an improved log chain having greater flexibility, versatility and usable interchangeably to form a free running choke as well as a fixed choke of a selected girth.

Another object of the invention is to provide an improved log chain having either a single or a pair of similar specially designed hooks at its opposite ends devoid of auxiliaries or additional moving parts and either hook of which can be used selectively to form a free running choke or a fixed choke.

These and other more specific objects will appear upon reading the following specification and claims and upon considering in connection therewith the attached drawing to which they relate.

Referring now to the drawing in which a preferred embodiment of the invention is illustrated:

FIG. 1 is a fragmentary view showing a preferred embodiment of the chain with the specially contoured hooks properly positioned to be coupled together;

FIG. 2 is a vertical view taken from the lower left hand side of FIG. 1 and including, partly in dotted line, a showing of the hooks after being coupled together;

FIG. 3 is a fragmentary cross sectional view taken along line 3—3 of FIG. 2;

FIG. 4 is a diagrammatic perspective view showing the chain formed into a free running choke;

FIG. 5 is a diagrammatic view showing the manner in which the chain is assembled to form a fixed choke; and FIG. 6 is a view showing the relative positions of the links adjacent the hook when assembled to form a fixed choke.

Referring more particularly to FIGS. 1 and 2, there is shown a preferred embodiment of the invention log chain designated generally 10, formed by a plurality of identical elongated links 11 and preferably provided at its ends with identical specially contoured hooks 12. These hooks may be forged or cast from high strength steel. Each has a hook 13 provided with a generally circular opening 14 having a diameter slightly greater than the transverse diameter Y (FIG. 2) of the chain links 11. It will therefore be readily apparent that the links pass freely through opening 14 when their longer axis coincide with the axis of opening 14.

Hook 12 includes a shank extending radially therefrom and having a loop 16 at its free end coupled to the end link of the chain. Superior results are achieved if the distance between the center of the hook opening 14 and the center of loop 16 is somewhat greater than the overall length of one of the links 11 for reasons which will become evident presently.

Hook 12 has an elongated entrance passageway 18 disposed as is best illustrated in FIG. 1 with its axis generally radially of opening 14 and close to one lateral edge 19 of shank 15. The axis of the passageway thus lies at an acute angle to shank 15. The width of entrance passageway 18 is slightly greater than the transverse diameter Y (FIG. 2) of the link material, the opposite sides of the passageway lying parallel to one another. Desirably, the shank side of the passageway is somewhat greater than the width of a link. Accordingly, the mid portion of a link can be placed against edge 19 of the passageway and then shifted bodily lengthwise of this edge into and out of opening 14. Once a link has passed freely into this opening this link as well as those to either end of it may be pulled easily through opening 14 without intereference from the hook. However, the chain cannot become uncoupled from opening 14 except by holding the mid portion of a link in alignment with the plane of passageway 18 and then shifting it in that plane until free of the passageway.

The portions of both of the hooks 12, 12' are likewise so contoured that they can be coupled or uncoupled only when properly positioned and moved relative to one another. To couple the hooks 12, 12' together, they are held in the positions shown in FIGS. 1, 2 and 3 with their passageways 18, 18' in axial alignment and with the plane of the two hooks rotated 90° to one another. When so held, the overlapping portions of the two passageways will have the appearance shown in the cross sectional view of FIG. 3. Accordingly, the two hooks may be moved into coupled position by moving them in their respective planes and axially of the overlapped passageways 18, 18'. As will be readily apparent, the hooks cannot be engaged or disengaged unless manipulated in this manner.

Referring now to FIG. 4 the invention chain is shown formed with a free running loop 20 encircling a log 21. This loop is formed readily by looping the chain about the log and then holding the mid portion of one of the links 11 against the longer edge 19 of passageway 18. While so held the link is moved bodily through the passageway into opening 14. Thereafter, the longer free end of the chain is tensioned to contract loop 20 of the free running choke tightly against the exterior of log 21. The greater the pull placed on the chain the tighter will the choke grip the log.

The chain is quickly and easily released as soon as the tension is relaxed by holding the free end of the chain perpendicular to the chain of hook 12 thereby allowing the chain to pass freely backwardly through opening 14 and providing sufficient slack to permit the chain to be disengaged from the hook by reversing the described assembly procedure.

Referring now to FIGS. 5 and 6, there will be described the simple procedure used to form a fixed choke. The first step of this procedure is to form a free running choke 20' in the same manner just described in connection with FIG. 4, it being understood that the free running choke 20' extends from the shank end of hook 12 through the hook opening 14. Once this operation has been performed the opposite end of the log chain is formed into a second loop 22 which will now become the fixed choke. While the chain is in the configuration illustrated in FIG. 5 the free running choke 20' is reduced in length to approximately three chain links, these being the three links A, B, and C immediately adjacent hook 12. Referring to FIG. 6, it will be observed that links A and C converge upwardly from one face of hook 12, with their upper ends interconnected by link B. The other links of the chain extend from the lower end of link C with a selected number thereof forming the loop portion 22 of the fixed choke. The length of this choke is adjusted to a desired length or girth while links A, B and C remain untensioned. Thereafter, tensioning of the chain utilizes link B to clamp and lock the underlying link against the face of the hook shank. So long as the fixed choke is under load, the tension force acting on link C is highly effective in cooperating with links A and B and the hook shank in holding the fixed choke rigidly locked in a selected adjusted position. The girth of the fixed choke can be readily adjusted by relaxing the chain tension and moving the chain in one direction or the other beneath link B and then reapplying the tension.

While the particular multiple purpose log chain herein shown and disclosed in detail is fully capable of attaining the objects and providing the advantages hereinbefore stated, it is to be understood that it is merely illustrative of the presently preferred embodiment of the invention, and that no limitations are intended to the details of construction or design herein shown other than as defined in the appended claims.

I claim:

1. A multipurpose log chain usable selectively to form a fixed choke and a free running choke at the user's option, said chain comprising a plurality of identical elongated links coupled together and equipped with a hook at one end formed with a generally circular opening of a diameter slightly greater than the transverse width of said chain links, said hook having a shank end coupled to said chain and so spaced from the center of said circular opening that the three adjacent end links of said chain can be looped about another portion of the chain with the third link projecting into the hook opening thereby to lock said other portion of the chain immovably against the shank of said hook to form a fixed choke, said hook having an entrance passage loosely passing the cross-sectional diameter of the link material whereby any link may be shifted into and out of the hook opening, and said chain being formed with a free running choke by tensioning said chain when the hook-equipped end thereof is formed into a simple loop with an intermediate portion of the chain passing through the hook opening.

2. A log chain as defined in claim 1 characterized in that both ends of said chain are equipped with similar hooks each usable with the adjacent portion of the chain to form a fixed choke and a free running choke at the user's option.

3. A log chain as defined in claim 1 characterized in that the entrance passage into the opening of said hook is elongated and positioned close to but at an acute angle to the longitudinal axis of the hook shank.

4. A log chain as defined in claim 1 characterized in that the entrance passage into the opening of said hook is elongated and disposed close to one lateral edge of said shank and generally radially of the hook opening.

5. A log chain as defined in claim 4 characterized in that both ends of said chain are equipped with similar hooks with the entrance passage of each being sized and shaped to be coupled and uncoupled when the entrance passages of said hooks are aligned to face in opposite directions and with the planes of the hooks lying at right angles to one another thereby permitting said hooks to be bodily shifted into and out of coupled relation relative to one another.

References Cited

UNITED STATES PATENTS

| | | | |
|---|---|---|---|
| 320,047 | 6/1885 | Hook | 294—82 |
| 630,837 | 8/1899 | Anderson | 294—74 |
| 932,776 | 8/1909 | Gentner | 294—82 |
| 1,702,946 | 2/1929 | Powers | 294—82 |
| 1,959,985 | 5/1934 | Moll | 294—82 |
| 2,387,675 | 10/1945 | Orme | 294—82 |
| 2,533,905 | 12/1950 | Aconley | 294—74 |
| 2,793,066 | 5/1957 | Rue | 294—82 |

CHARLES W. LANHAM, Primary Examiner

G. P. CROSBY, Assistant Examiner

U.S. Cl. X.R.

294—74